United States Patent [19]
Ganesan

[11] Patent Number: 5,748,735
[45] Date of Patent: May 5, 1998

[54] SECURING E-MAIL COMMUNICATIONS AND ENCRYPTED FILE STORAGE USING YAKSHA SPLIT PRIVATE KEY ASYMMETRIC CRYPTOGRAPHY

[75] Inventor: Ravi Ganesan, Arlington, Va.

[73] Assignee: Bell Atlantic Network Services, Inc., Arlington, Va.

[21] Appl. No.: 663,019

[22] Filed: Jun. 7, 1996

Related U.S. Application Data

[63] Continuation-in-part of Ser. No. 277,376, Jul. 18, 1994, Pat. No. 5,557,678, and a continuation-in-part of Ser. No. 338,128, Nov. 9, 1994, Pat. No. 5,535,276.

[51] Int. Cl.⁶ ............................................. H04L 9/08
[52] U.S. Cl. ..................................... 380/21; 380/30
[58] Field of Search .................................. 380/21, 30

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,736,423 | 4/1988 | Matyas . |
| 4,860,353 | 8/1989 | Brown . |
| 4,888,800 | 12/1989 | Marshall et al. . |
| 4,926,478 | 5/1990 | Gruenberg . |
| 4,965,827 | 10/1990 | McDonald . |
| 4,995,082 | 2/1991 | Schnorr . |
| 5,029,208 | 7/1991 | Tanaka . |
| 5,052,040 | 9/1991 | Preston et al. . |
| 5,150,411 | 9/1992 | Maurer . |
| 5,208,853 | 5/1993 | Armbruster et al. . |
| 5,241,594 | 8/1993 | Kung . |
| 5,241,597 | 8/1993 | Bright . |
| 5,241,598 | 8/1993 | Raith . |
| 5,251,258 | 10/1993 | Tanaka . |
| 5,253,294 | 10/1993 | Maurer . |
| 5,276,737 | 1/1994 | Micali . |
| 5,299,263 | 3/1994 | Beller et al. . |
| 5,375,169 | 12/1994 | Seheidt et al. . |
| 5,467,398 | 11/1995 | Pierce et al. ............................... 380/44 |

OTHER PUBLICATIONS

R.L. Rivest, A. Shamir & L. Adleman, A Method for Obtaining Digital Signatures and Public–key Cryptosystems, CACM, vol. 21, pp. 120–126, Feb. 1978.

M.J. Wiener, "Cryptanalysis of Short RSA Secret Exponents", IEEE Transaction on Information Theory, vol. 36, No. 3, pp. 553–558.

*Primary Examiner*—Gilberto Barrofi, Jr.
*Attorney, Agent, or Firm*—Lowe, Price, LeBlanc & Becker

[57] ABSTRACT

A method is provided for securing stored files in a system having a plurality of system users with each system user having an associated asymmetric crypto-key with a public key portion and a corresponding private key portion. Each public key portion is accessible to the plurality of system users. Each private key portion has a first private key portion known only to the associated user and a corresponding second private key portion known only to a security server. Data to be stored is identified. A symmetric crypto-key is encrypted with only the second private key portion of a first user crypto-key to form an encrypted key message, thereby restricting access to the symmetric crypto-key to only the first user. The symmetric crypto-key is obtained by the first user by applying the first private key portion of the first user crypto-key to decrypt the encrypted key message. The first user encrypts the data with the symmetric crypto-key to form an encrypted file, and stores the encrypted file and the encrypted key message.

24 Claims, 8 Drawing Sheets

*Figure 11*

SECURING E-MAIL COMMUNICATIONS AND ENCRYPTED FILE STORAGE USING YAKSHA SPLIT PRIVATE KEY ASYMMETRIC CRYPTOGRAPHY

RELATED APPLICATIONS

This application is a continuation-in-part of application Ser. No. 08/277,376 filed Jul. 18, 1994 now U.S. Pat. No. 5,557,678 and a continuation-in-part of 08/338,128, filed Nov. 9, 1994 now U.S. Pat. No. 5,535,276.

FIELD OF THE INVENTION

The present invention relates generally to securing communications and stored files using cryptography. More particularly, the present invention provides secure electronic mail communications, such as INTERNET e-mail, and electronic data storage using asymmetric crypto-keys.

BACKGROUND ART

Cryptosystems have been developed for maintaining the privacy of information transmitted across a communications channel. Often, a symmetric cryptosystem is used for this purpose. Symmetric cryptosystems, which utilize electronic keys, can be likened to a physical security system where a box has a single locking mechanism with a single key hole. One key holder uses his/her key to open the box, place a message in the box and relock the box. Only a second holder of the identical copy of the key can unlock the box and retrieve the message. The term symmetric reflects the fact that both users must have identical keys.

In more technical terms, a symmetric cryptosystem comprises an encryption function E, a decryption function D, and a shared secret-key, K. The key is a unique string of data bits to which the functions are applied. Two examples of encipherment/decipherment functions are the National Bureau of Standards Data Encryption Standard (DES) and the more recent Fast Encipherment Algorithm (FEAL). To transmit a message, M, in privacy, the sender computes C=E (M,K), where C is referred to as the ciphertext. Upon receipt of C, the recipient computes M=D (C,K), to recover the message M. An eavesdropper who copies C, but does not know K, will find it practically impossible to recover M. Typically, all details of the enciphering and deciphering functions, E and D, are well known, and the security of the system depends solely on maintaining the secrecy of key, K. Conventional symmetric cryptosystems are fairly efficient and can be used for encryption at fairly high data rates, especially if appropriate hardware implementations are used.

Asymmetric cryptosystems, often referred to as public key cryptosystems, provide another means of encrypting information. Such systems differ from symmetric systems in that, in terms of physical analogue, the box has one lock with two non-identical keys associated with it. For example, in an RSA system, either key can be used to unlock the box to retrieve a message which has been locked in the box by the other key. However, the system could be limited to using the keys in a particular sequence, such that the box can only be locked with the one key and unlocked with the other key.

In public key electronic cryptosystems, each entity, has a private key, d, which is known only to the entity, and a public key, En, which is publicly known. Once a message is encrypted with a user's public-key, it can only be decrypted using that user's private-key, and conversely, if a message is encrypted with a user's private-key, it can only be decrypted using that user's public-key. It will be understood by those familiar with the art that although the terms "encrypt" and "decrypt" and derivations thereof are used herein in describing the use of public and private keys in an asymmetric public key cryptosystem, the term "transform" is commonly used in the art interchangeably with the term "encrypt" and the term "invert" is commonly used in the art interchangeably with the term "decrypt". Accordingly, as used herein in describing the use of public and private keys, the term "transform" could be substituted for the term "encrypt" and the term "invert" could be substituted for the term "decrypt".

If sender x wishes to send a message to receiver y, then x, "looks-up" y's public key En, and computes $M=E(C,e_y)$ and sends it to y. User y can recover M using its private-key $d_y$, by computing $C=D(M,d_y)$. An adversary who makes a copy of C, but does not have $d_y$, cannot recover M. However, public-key cryptosystems are inefficient for large messages.

Public-key cryptosystems are quite useful for digital signatures. The signer, x, computes $S=E(M,d_x)$ and sends [M,S] to y. User y "looks-up" x's public-key $e_x$, and then checks to see if $M=D(S,e_x)$. If it does, then y can be confident that x signed the message, since computing S, such that $M=D(S,e_x)$, requires knowledge of $d_x$, x's private key, which only x knows.

Public-key cryptography also provides a convenient way of performing session key exchange, after which the key that was exchanged can be used for encrypting messages during the course of a particular communications session and then destroyed, though this can vary depending on the application.

One public key cryptographic system is the Rivest, Shamir, Adleman (RSA) system, as described in Rivest, Shamir and Adleman, "A Method of Obtaining Digital Signatures and Public Key Cryptosystems", CACM, Vol 21, pp 120–126, February 1978. RSA is a public-key based cryptosystem that is believed to be very difficult to break. In the RSA system the pair $(e_i,N_i)$, is user i's public-key and $d_i$ is the user's private key. Here $N_i$=pq, where p and q are large primes. Here also $e_i d_i = 1 \mod \phi(N_i)$, where $\phi(N_i)=(p-1)(q-1)$ which is the Euler Toitient function which returns the number of positive numbers less than $N_i$, that are relatively prime to $N_i$. A Carmichael function is sometimes used in lieu of a Euler Toitient function.

To encrypt a message being sent to user j, user i will compute $C=M^{(e_j)} \mod n_j$ and send C to user j. User j can then perform $M=C^{(d_j)} \mod n_j$ to recover M. User i could also send the message using his signature. The RSA based signature of user i on the message, M, is $M^{d_i} \mod N_i$. The recipient of the message, user j, can perform $(M^{(d_i)} \mod N_i)^{e_i} \mod N_i$, to verify the signature of i on M.

In a typical mode of operation, i sends j, $N^{(d_i)} \mod N_i$ along with M and a certificate $C=(i,e_i N_i)^{(d_{CA})} \mod N_{CA}$, where C is generated by a Certificate Authority (CA) which serves as a trusted off-line intermediary. User j can recover i's public key from C, by performing $C^{(e_{CA})} \mod N_{CA}$, as $e_{CA}$ and $N_{CA}$ are universally known. It should also be noted that in an RSA system the encryption and signatures can be combined.

Modifications to RSA systems have been proposed to enable multi-signatures to be implemented. Such an approach is described in "Digital Multisignature", C. Boyd, Proceedings of the Inst. of Math, and its Appl. on Cryptography and Coding, Dec. 15–17, 1986. The proposed approach extends the RSA system by dividing or splitting the user private key d into two or more portions, say $d_a$ and $d_b$, where $d_a * d_b = d$.

An improved system using split key public encryption has been disclosed, see U.S. patent application Ser. No. 08/277, 808 filed on Jul. 20, 1994 for Y. Yacobi and R. Ganesan entitled "A System and Method for Identity Verification, Forming Joint Signatures and Session Key Agreement in an RSA Public Cryptosystem". The described system and method, allow two system users to verify each other's identity, form a joint signature and establish and distribute a session key in an RSA environment.

The system developed by Yacobi and Ganesan provides significant benefits where no intermediary between the users needs to be empowered with the ability to ease drop on encrypted communications. However, in practical systems, it is often desirable or required, for reasons other than security, that an intermediary with such power be placed between the users. Such an intermediary can provide a central point of audit and service cancellation, as well as other benefits. For example, public subscription systems, such as INTERNET electronic mail systems, will normally have a central intermediary empowered to monitor the access of a subscriber and terminate access should a subscriber fail to pay his monthly access fee.

"A Secure Joint Signature and Key Exchange System", Bellcore Technical Document see also U.S. patent application Ser. No. 08/277,808 filed on Jul. 20, 1994, now U.S. Pat. No. 5,588,061 which is also assigned to the assignee of the present application, modified Boyd's system, and made four significant additional points regarding split private key asymmetric cryptosystems. Although specifically applied to the two party case, the findings can be utilized more generally. The first point is that, assuming all operations are modulo N, breaking the joint signature system is equivalent to breaking RSA. This is true whether the attacker is an active or passive eavesdropper or one of the system users. It is assumed that key generation is conducted by a trusted third party, for example a tamper proof chip, and the factors of the RSA modulus N and $\phi(N)$ are discarded after key generation and not known to any of the system users. The second point is the description of the following key exchange protocol: User 1 sends $c_1 = m_1^{d_1}$ to User 2. User 2 recovers $m_1 = c_1^{d_2}$. Similarly User 2 transmits $m_2$ to User 1. Each user then computes $m = f(m_1, m_2)$, where $f$ is a function like XOR. Page and Plant prove mathematically that breaking this scheme is equivalent to breaking RSA. Again this is true whether the attacker is an active or passive eavesdropper or one of the system users. The third point is the introduction of the concept that one of the two users is a central server which maintains one portion of every user's RSA private key. In order to sign a message the user must interact with this server which, it is shown, cannot impersonate the user. Having to interact with such a central server has several important practical advantages, including instant revocation without difficult to maintain Certificate Revocation Lists (CRL), Kent, S., "Privacy Enhancement for Internet Electronic Mail: Part II: Certificate Based Key Management", INTERNET RFC 1422, Feb. 1993, a central point for audit, and a way of providing for digital signatures in an era where smart cards are not yet ubiquitous. Finally, the paper also proves mathematically that even if one of the two portions, $d_1$ and $d_2$, of the private key, d, is short, say 64 bits, an eavesdropper will have equal difficulty breaking the split key system as would be experienced in breaking RSA. As a consequence, a digital signature infrastructure can be built where users who remember short, e.g., 8-9 characters, passwords, can interact with the central server to create RSA signatures which are indistinguishable from those created using a full size private key stored on a smart card.

One symmetric cryptosystem is the Kerberos authentication system, Kohl, J. T. and B. C. Neuman, "The Kerberos Network Authentication Service", INTERNET RFC 1510, September 1993, which is based on the classic Needham-Schroeder authentication protocols, Needham, R. M. and Schroeder M. D., "Using Encryption for Authentication in Large Networks of Computers", Communications of the ACM, v. 21, n. 12, Dec. 1978, with extensions by Denning-Sacco, D. E. Denning and G. M. Sacco, "Timestamps in Key Distribution Protocols," Communications of the ACM, v. 24, n. 8, Aug. 81, pp. 553–536. The system uses a trusted third party model to perform authentication and key exchange between entities in a networked environment, for example, over a local or wide area network. Kerberos uses symmetric key cryptosystems as a primitive, and initial implementations use the Data Encryption Standard (DES) as an interoperability standard, though any other symmetric encryption standard can be used. After close to a decade of effort, the Kerberos authentication system is now a fairly mature system whose security properties have held up fairly well to intense scrutiny. Further, vendors are now delivering Kerberos as a supported product. Kerberos has also been adopted as the basis for the security service by the Open Software Foundation's (OSF) Distributed Computing Environment (DCE). Consequently, Kerberos can be expected to be among the most widespread security systems used in distributed environments over the next several years.

Figure 1:
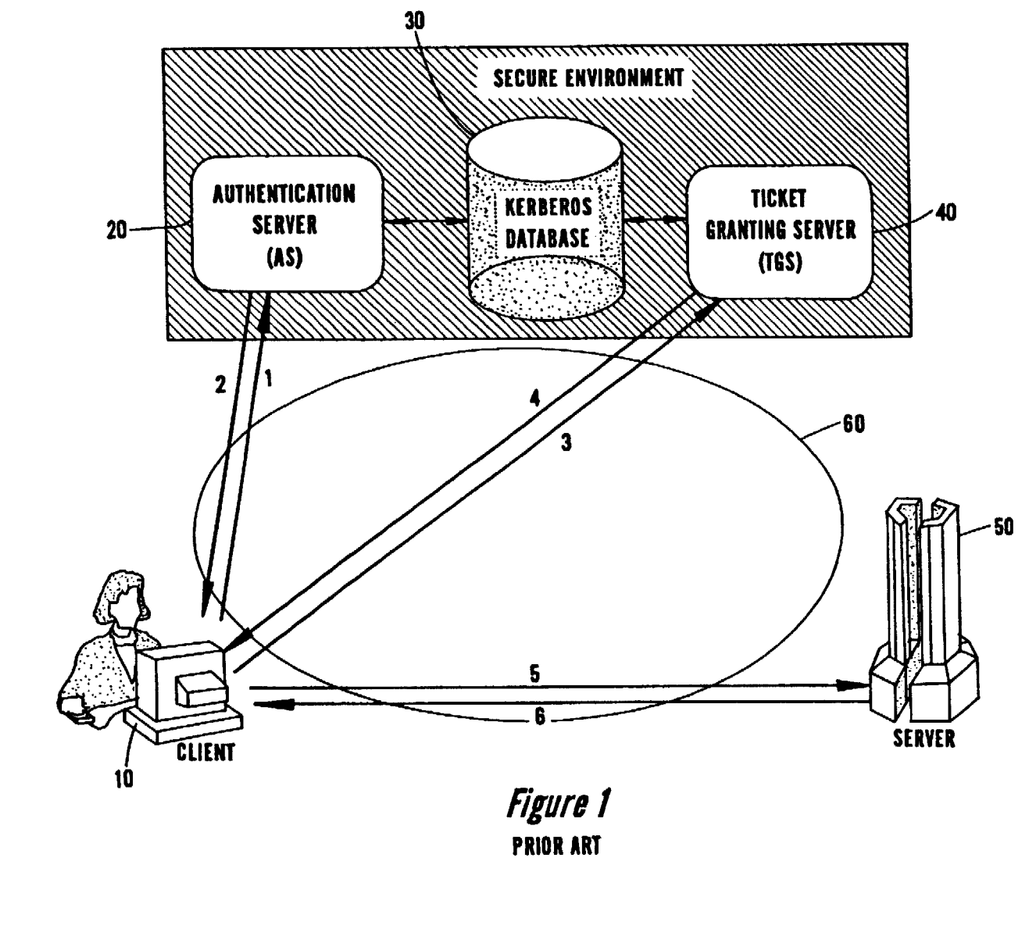
FIG. 1 is a diagram of a conventional Kerberos authentication system.

For the sake of clarity, a "simplified" version of the Kerberos protocol described by Neuman and Ts'o in Neuman, B. C. and Ts'o, T., "Kerberos: An Authentication Service for Computer Networks", IEEE Communications, September 1994, will be discussed below. The complete protocol is described in Kohl, J. T. and Neuman, B. C., "The Kerberos Network Authentication Service", INTERNET RFC 1510, September 1993. Further, the following discussion is based on Neuman, B. C. and Ts'o, T., "Kerberos: An Authentication Service for Computer Networks", IEEE Communications, September 1994, and for the sake of consistency uses almost the same notation. The fundamental message exchanges are shown in FIG. 1. In message 1 the user uses a personal computer or workstation 10 to request a ticket granting ticket (TGT) from an authentication/security server (AS) 20. The server 20 creates such a ticket TGT, looks up the user's password from the Kerberos database 30, encrypts the TGT with the password and sends it to the user via the computer 10 in message 2. The user decrypts the TGT with her password using computer 10, and stores the TGT on computer 10, for example on a hard disk or in the random access memory (RAM). Then, when the user desires to access a service, she sends message 3, which contains the TGT to the ticket granting server 40. The server 40 verifies the TGT and sends back, in message 4, a service ticket to access the service server 50, and a session key, encrypted with the user's password retrieved from database 30. In message 5 the user presents via computer 10 the service ticket to the server 50, which verifies it and also recovers the session key from it. If mutual authentication is required, the server 50, in message 6, sends back a message encrypted with the session key. All communications between servers 20, 40 and 50 and computer 10 are via network 60, e.g. the INTERNET. All communications between servers 20 and 40 and database 30 are preferably by direct communications link.

An improved Kerberos type system is described in U.S. patent application Ser. No. 08/338,128 filed on Nov. 9, 1994, now U.S. Pat. No. 5,535,276 entitled "YAKAHA, an Improved System and Method for Securing Communications Using Split Private Key Asymmetric Cryptography", which is also assigned to the assignee of the present application and incorporated herein by reference. The described system provides for secured communications in a way in which the compromise of a central database, such as the secured database in a conventional Kerberos system, will not be catastrophic to the overall system security. The system is also less vulnerable to dictionary attacks than conventional systems and provides a way for one user to authenticate itself to another user. The described system facilitates digital signatures being placed on a message and thereby provides for non-repudiation. Additionally, the system can be implemented to enhance security in conventional Kerberos systems with minimum changes to the standard Kerberos protocol and is compatible with the use of "smart cards". Finally, the described system allows the reuse of an authentication infrastructure for digital signatures.

Another system having central server is describe in U.S. patent application Ser. No. 08/277,376 filed on Jul. 18, 1994; now U.S. Pat. No. 5,557,678 entitled "A System and Method for Centralized Session Key Distribution, Privacy Enhanced Messaging and Information Distribution Using A Split Private Key Public Cryptosystem", which is also assigned to the assignee of the present application and incorporated herein by reference. The described system uses split private key public encryption to provide automatic identity verification by a central intermediary prior to any information being exchanged. Additionally, the described system ensures that the users are authorized before a communications session is established. The system facilitates the distribution of session keys, and the proper authorization and implementation of wire taps. The described system can additionally provide privacy enhanced messaging and is particularly suitable for the secure distribution of video, data and other messages.

Although the above systems provide a great deal of security and flexibility, problems still exist in exchanging symmetric session crypto-keys between users of virtual area networks, such as the INTERNET, who utilize different cryptosystems. For example, although the users who will participate in a communications session may all have an assigned private/public key pair, i.e are all part of an asymmetric cryptosystem, only some of the user's may have a split private key, i.e., are part of an asymmetric split key cryptosystem. Further, because virtual area networks have open access, data stored on file servers and other storage devices directly or indirectly connected to such networks is extremely vulnerable to security breaches and attack.

OBJECTIVES OF THE INVENTION

Accordingly, it is an object of the present invention to provide for exchanges of symmetric session crypto-keys between users of virtual area networks, such as the INTERNET, who utilize different crypto-systems.

It is a further object of the present invention to provide enhanced security for data stored on file servers and other storage devices directly or indirectly connected to such networks.

The advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

SUMMARY OF THE INVENTION

According to the present invention, in a system having a plurality of system users, each user has an associated asymmetric crypto-key with a public key portion and a corresponding private key portion. Each public key portion is accessible to the plurality of system users. The private key portion of at least some of the users has a first private key portion known only to the associated user and a corresponding second private key portion known only to a security server. The private key portion of other users is known only to the associated user.

To secure stored files, the data to be stored on a file server is first identified by a user and forwarded to a file server or other storage device. A symmetric crypto-key is encrypted by the security server, or other central security authority, with the second private key portion of the file server's crypto-key, to form an encrypted key message. This ensures that only the appropriate file server will have access to the symmetric crypto-key. The encrypted key message is forwarded to the user for forwarding along with the data to the appropriate file server.

The file server can obtain the symmetric crypto-key by applying the first private key portion of the file server's crypto-key to decrypt the encrypted key message. The file server can now encrypt the identified data with the symmetric crypto-key to form an encrypted file, and store the encrypted file and the encrypted key message on an associated memory device.

If the user desires to retrieve the stored data, a retrieve file request is first encrypted by the user with the first private key portion of the user's crypto-key to form a first encrypted retrieve file request. This authenticates the user's request. The security server obtains the retrieve file request by applying the second private key portion of the user's crypto-key to the first encrypted retrieve file request. The first encrypted retrieve file request may be encrypted by the security server with the second private key portion of the user's crypto-key to form a second encrypted retrieve file request. This authenticates the user's request. The second encrypted retrieve file request is forwarded to the file server.

The retrieve file request is obtained by the file server by applying the public key portion of the user's crypto-key to decrypt the second encrypted retrieve file request. Responsive to the request, the file server retrieves the encrypted file and the encrypted key message from storage. The file server obtains the symmetric crypto-key by applying the first private key portion of the file server's crypto-key to decrypt the retrieved encrypted key message. The file server then obtains the requested data by applying the symmetric crypto-key to decrypt the retrieved encrypted file. The file server directs the data to the requesting user.

If desired, the security server may also encrypt the retrieve file request with the second private key portion of the file server's crypto-key to form the second encrypted retrieve file request. In such a case, the file server obtains the retrieve file request by additionally applying the first private key portion of the file server's crypto-key to decrypt the second encrypted retrieve file request.

Each key portion has a bit length and preferably the bit length of each first private key portion is smaller than the bit length of the associated second private key portion. Beneficially, the bit length of each first private key portion is between 56 and 72 bits. Further, each private key portion is comprised of a private exponent and modulus N which is a product of a plurality of numbers within a set of large prime numbers. Each public key portion is comprised of a public exponent and the modulus N. Advantageously, the modulus N has a bit length and the bit length of each private key portion is no larger than fifteen percent of the bit length of the modulus N but not less than 56 bits.

In accordance with other aspects of the invention, session key distribution is facilitated between a first user having a first private key portion known only to the first user and a corresponding second private key portion known only to the security server and a second user having a private key portion known only to the second user, i.e. the second user's private key is not split. To accomplish session key distribution, the first user encrypts a session key request with the first private key portion of the user's crypto-key to form a first encrypted message. The security server decrypts the first encrypted message by applying the first user's second private key portion to thereby obtain the session key request. The security server then encrypts a symmetric crypto-key with the second private key portion of the first user crypto-key to form a first encrypted key message. The security server also encrypts the symmetric crypto-key with the public key portion of the second user's crypto-key to form a second encrypted key message.

The first user decrypts the first encrypted key message by applying the first user's first private key portion to obtain the symmetric crypto-key. The second user decrypts the second encrypted key message by applying the private key portion of the second user's crypto-key to obtain the symmetric crypto-key. Accordingly, both users now have access to the symmetric crypto-key which will serve as the session key for encrypting and decrypting communications between the users.

Each user station, including the file server(s), and the security server will typically be represented by a computer which is driven by programming instructions stored on an associated computer readable storage medium to operate in the described manner. The computer could be a personal computer, work station, mini-computer, main frame computer or any other computing device with sufficient power to perform in accordance with the invention. The computer readable storage could be a hard or floppy disk, CD, ROM, RAM, DRAM, SRAM, EPROM or other memory device, including electrical, magnetic and optical memory. Storage media associated with each user station or file server may be adapted to store the first private key portion of the user crypto-key. If the user does not have a split private key, the storage media will typically store the private key portion of the user's crypto-key. Storage media associated with the security server will typically store the second private key and/or the public key portion of each user's crypto-key.

BEST MODE FOR CARRYING OUT THE INVENTION

It should also be understood that the crypto-keys are created, as in any public-key cryptosystem, in accordance with the established policy. The creation and issuance of asymmetric crypto-key could, for example, be performed by an organization's Security Department, perhaps the same organization that issues Photo ID's, using a terminal connected to a secure computer (e.g. a computer or processor with a tamper proof chip). A user could access this terminal, enter her or his name, etc. This information is certified by a security officer, whose password or private key the computer knows. The computer then creates an RSA or other public-private key pair, prompts the user for a password, which becomes the user's portion of the RSA private key. The computer computes the portion of the user's private key which is stored in a secured database, referred to as the Yaksha database. If the computer is also the security server acting as the certifying authority, it preferably computes the user's certificate. Any other user can obtain the user's public key by applying the certifying authorities public key to the user's certificate. This is a simplification of the complex structure of an actual certificate but is sufficient for purposes of this discussion, Kent, S., "Privacy Enhancement for Internet Electronic Mail: Part II: certificate Based Key Management", INTERNET RFC 1422, Feb. 1993.

Once smart cards are ubiquitous, the user-password may become irrelevant and the security server can download the user's (long) private key directly to a smart card. No method of key generation is critical to the functioning of the present invention, hence the above is only meant to be one possible scenario. Since the present invention is not vulnerable to the some of the attacks which conventional Kerberos systems are vulnerable to, the user's private key utilized in accordance with the present invention will have a longer useful life than in Kerberos.

It will be understood that a user may be a person or entity, a server or processor, or a system device such as a switch in a communications network. Preferably, for every user, there exists a first private asymmetric crypto-key portion known only to the user, i.e. each user's private key is split and the user maintains only a portion of the private key. However, for the foreseeable future this is unlikely to be the case. For those user's having a split private key, a second private crypto-key portion, i.e. the remainder of the user's private key, is stored on a secured database, i.e. the Yaksha database. Certificates exist on a certifying authority's server, i.e., the security server which is sometimes also referred to as the authentication server, and possibly on other servers and user processors, and every user knows the certifying authority's public key. All other intermediate key generation information has been destroyed, preferably within the safe confines of the tamper proof chip used to generate the crypto-keys.

Both the private and public encryption keys are typically generated using a private exponent and a modulus N which is the product of a large number of prime numbers. It is preferable that the length of the portion of the divided private encryption key which is maintained by the user be substantially smaller than the modulus N value. It is further preferred that the user portion of the divided private encryption key be no larger than 15% of the length of the modulus N but not less than 56 bits. If the modulus N is 512 bits in length and, the user portion of the private encryption key must be memorized by the user or stored in a personal communications device, the user's portion of the divided private encryption key is preferably between 56 and 72 bits.

Figure 2:
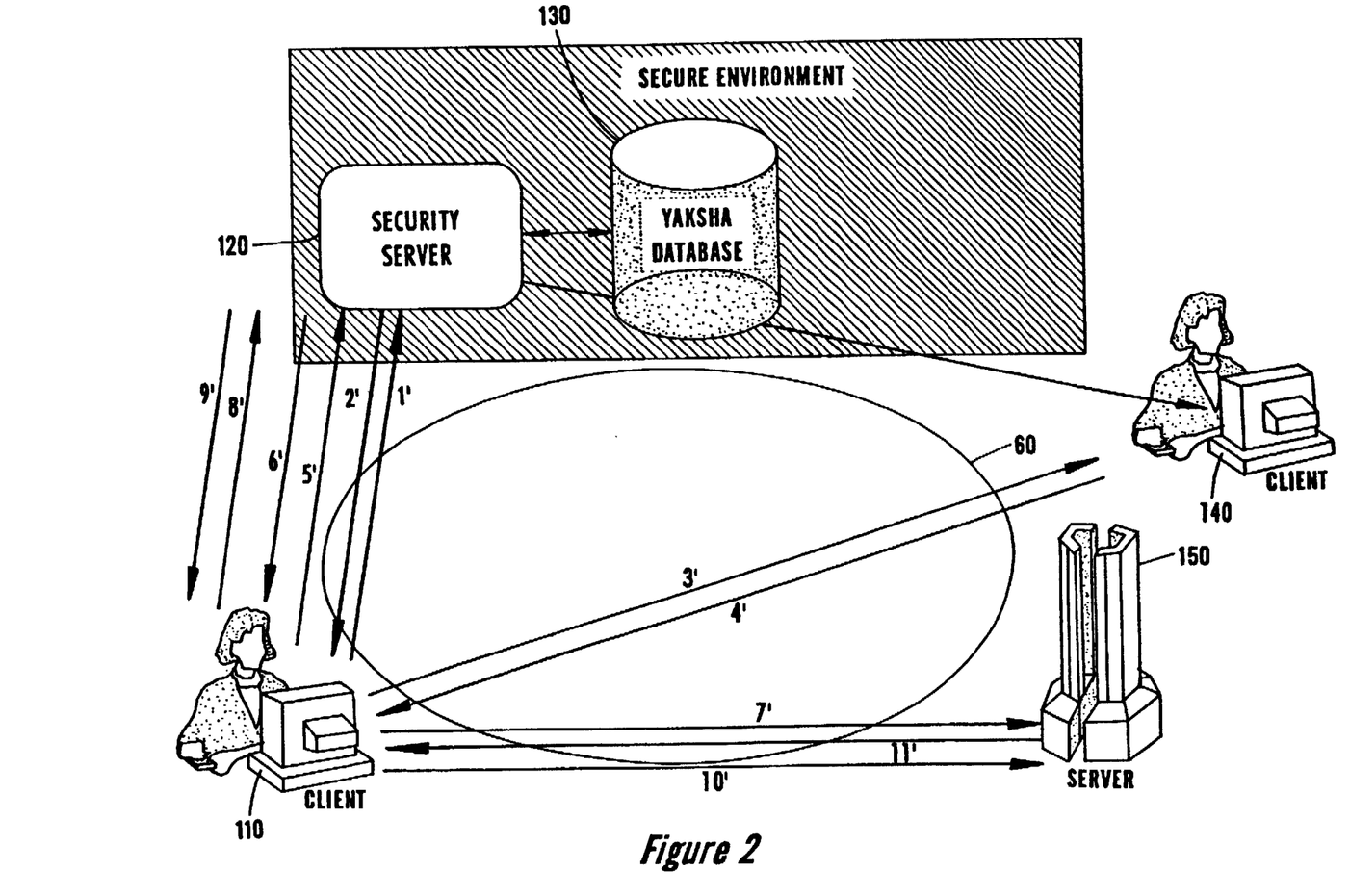
FIG. 2 is a diagram of a Yaksha system according to the present invention.
Figure 3:
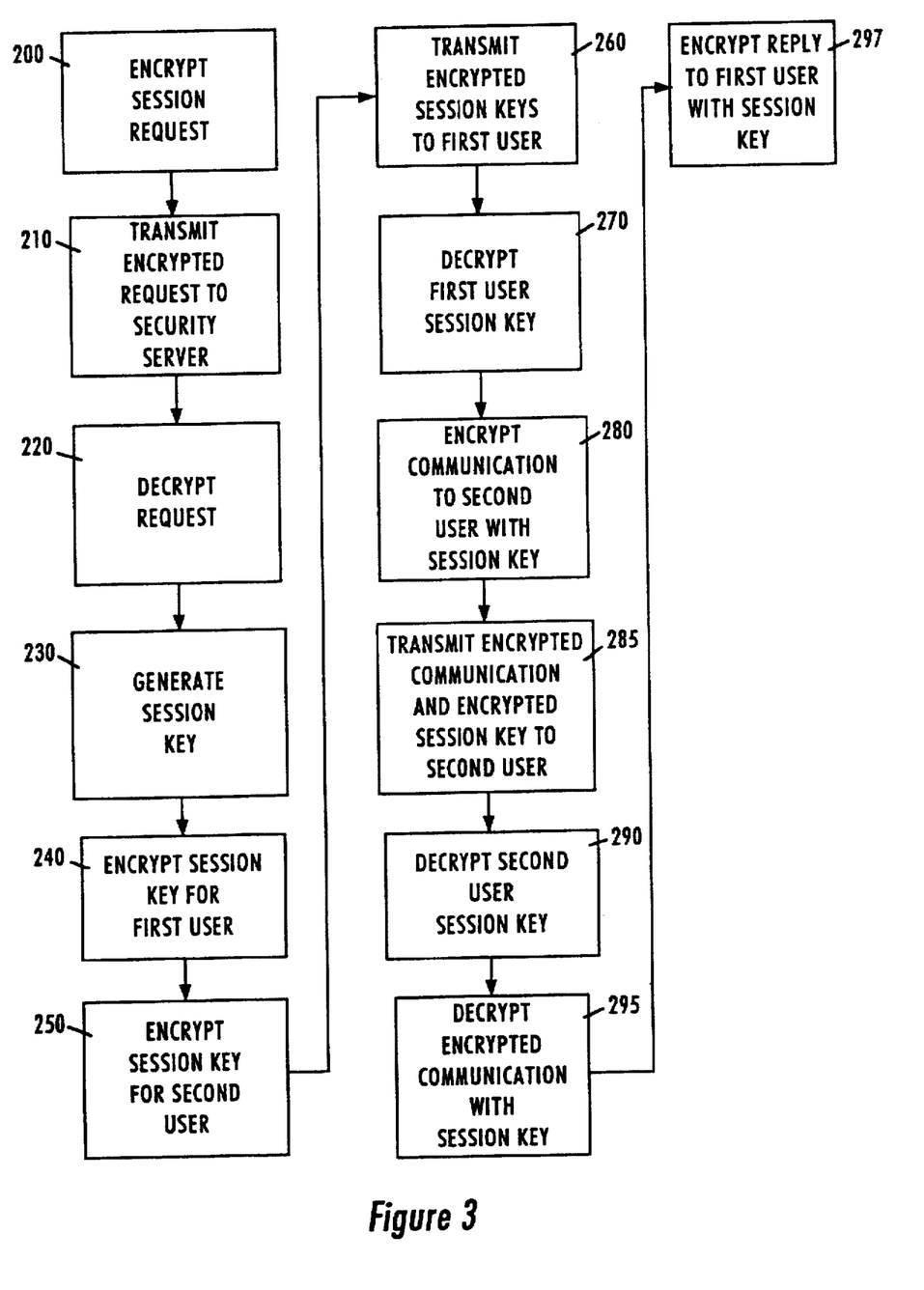
FIG. 3 is a flow diagram illustrating the steps for session key exchange in accordance with the present invention.
Figure 4:
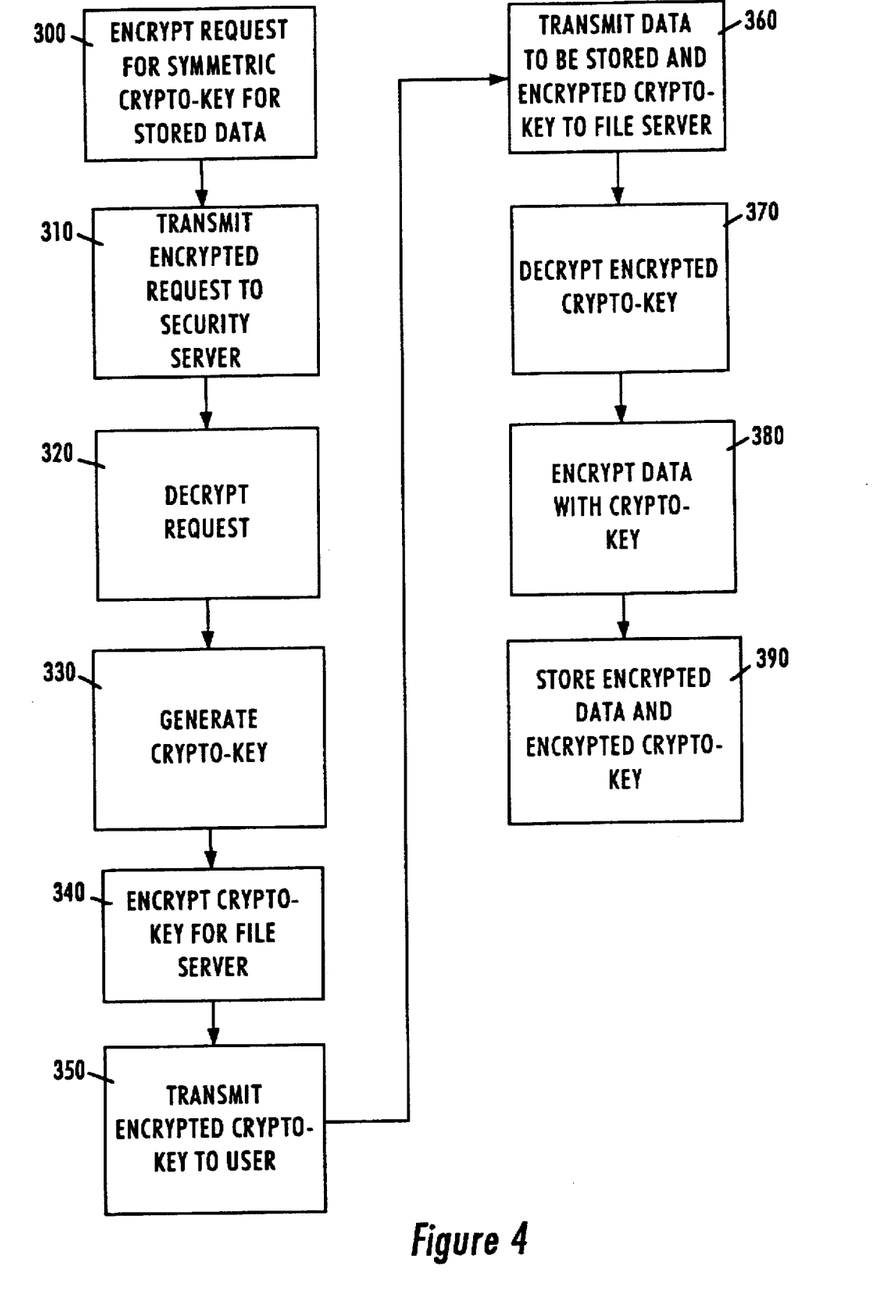
FIG. 4 is a flow diagram illustrating the steps for encrypting stored data in accordance with the present invention.
Figure 5:
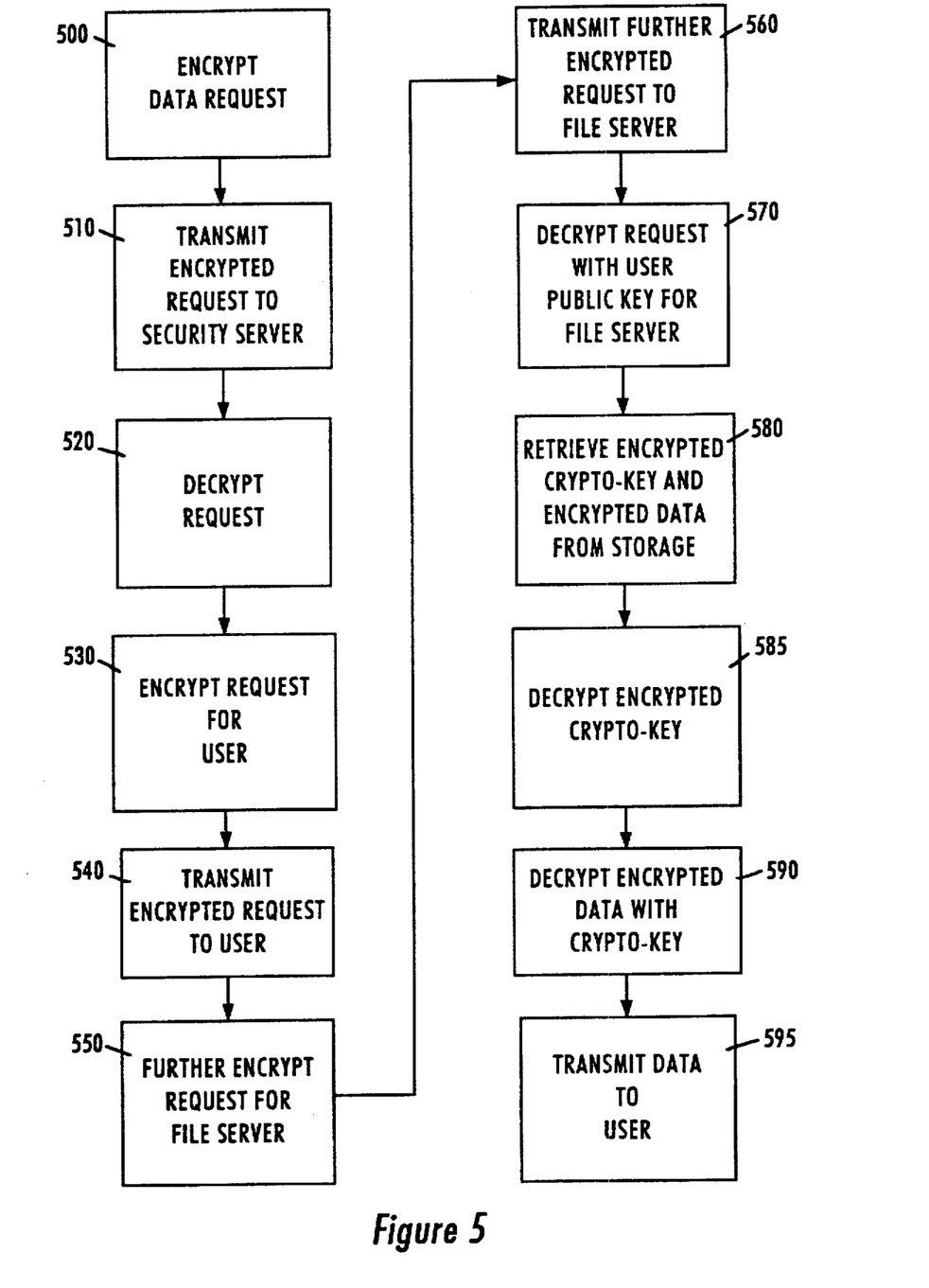
FIG. 5 is a flow diagram illustrating the steps for retrieving encrypted stored data in accordance with the present invention.

The present invention will now be described with reference to FIGS. 2–5. FIG. 2 is an exemplary embodiment of a system and FIGS. 3–5 illustrate the steps performed by the various system components to provide encrypted file storage and session key exchange in accordance with the present invention.

Referring first to FIG. 2, the user on client station 110, who will be referred to below as the first user, has a split private key with the second portion of the private key retained in the Yaksha database 130. The user on client station 140, who will be referred to below as the second user, does not have a split private key and therefore retains his/her full private key.

As shown, the system includes a personal computer, workstation or other type of client station 110 operated by one user and client station 140 operated by another user. The stations 110 and 140 are connected to network 60 which is identical to the network shown in FIG. 1. The network could, for example, be the INTERNET. The stations 110 and 140 can communicate with a security server 120, and a file server 150 via the network.

A YAKSHA database 130 is directly linked to the security server 120. For clarity, the ticket granting server of the type shown in FIG. 1 is not depicted but could, if desired, be easily included within the system and utilized in the manner previously described in application Ser. No. 08/338,128. A file server 160 is also a user of the system and is connected to the system via the network 60.

Each user, including each server, has an asymmetric crypto-key assigned to it. The key is made up of a public-private key pair, the public portion of which is known or available to all users as discussed above. The private portion of the key of user of client station 110 is divided into a first portion which is known only to that user and a second portion which is stored on the YAKSHA database 130 and accessible only to the security server 120.

Referring now to FIG. 3, session key distribution in accordance with the present invention will now be described. In step 200 the first user directs the client station 110 to encrypt a request to establish a communication session with a second user at client station 140 by applying the first user's first private key portion to the message. In step 210, the encrypted message is transmitted via the network 60 as message 1' to the security server 120. In response to the receipt of the request, in step 220 security server 120 retrieves the second portion of the first user's private key and the first user's public key from the Yaksha database 130 and applies the retrieved keys to the encrypted message to decrypt the request.

Responsive to the request, in step 230 the security server generates a symmetric session key. If desired, the session key could be pre-generated and stored on security server 120 or the Yaksha database 130; however it is generally preferable to generate session keys when required.

In step 240, the security server 120 encrypts the session key with the second portion of the first user's private key and the first user's public key to form a first encrypted session key. In step 250, the security server 120 retrieves the second user's public key from the Yaksha database 130 and encrypts the session key with the second user's public key to form a second encrypted session key. The first encrypted session key and the second encrypted session key are transmitted as message 2' to the client station 110 in step 260. The client station 110 decrypts the first encrypted session key with the first portion of the first user's private key in step 270. Accordingly, the first user now has access to the session key.

In step 280, a message is generated and encrypted by station 110 with the session key. The encrypted message and the second encrypted session key are communicated via the network 60, as message 3', to client station 140 in step 285. The client station 140, in step 290, decrypts the second encrypted session key with the second user's private key, thereby providing the second user with access to the session key. In step 295, the client station 140 applies the session key to decrypt the encrypted message from the first user. The client station 140 generates and encrypts a reply message with the session key in step 297. The encrypted reply message is communicated to the client station 110 via network 60 as message 4'. The encrypted reply message can be decrypted by the client station 110 applying the session key thereto. The session key can be utilized by the client stations 110 and 140 throughout the communication session to encrypt and decrypt messages exchanged between the first and second users.

Referring now to FIG. 4, encrypted data storage according to the present invention will be described. In step 300 the first user directs the client station 110 to encrypt a request for a crypto-key, to be used in encrypting data to be stored on file server 150, by applying the first user's first private key portion to the request. In step 310 the encrypted request is transmitted via the network 60 as message 5' to the security server 120. In response to the receipt of the encrypted request, security server 120, in step 320, retrieves the second portion of the first user's private key and the first user's public key from the Yaksha database 130 and applies the retrieved keys to the encrypted communication to decrypt the request.

Next, in step 330, the security server 120 generates a symmetric crypto-key. In step 340 the security server 120 encrypts the crypto-key with the second portion of the file server's private key and the file server's public key to form an encrypted symmetric crypto-key. In step 350, the encrypted crypto-key is transmitted as message 6' to the client station 110.

The client station 110 transmits the encrypted crypto-key, along with the data to be stored, to the file server 150 as message 7', in step 360. The data could of course be encrypted with, for example, a session key before transmission to file server 150. The identification of the first user is provided typically in the form of a Certification of the type discussed above.

The file server 150 decrypts the encrypted crypto-key with the first portion of the file server's private key in step 370. The file server 150, in step 380, encrypts the data to be stored with the crypto-key. In step 390, the file server stores the encrypted data and the encrypted crypto-key in memory. Accordingly, the data has now been stored by the file server 150 in an encrypted form.

Turning now to FIG. 5, the recovery of the encrypted data from storage will be described. In step 500, the first user directs the client station 110 to encrypt a request for the data by applying the user's first private key portion to the request, thereby forming a first encrypted message. In step 510 the first encrypted message is transmitted via the network 60 as message 8' to the security server 120. In response to the receipt of the encrypted message, security server 120, in step 520, retrieves the second portion of the first user's private key and the first user's public key from the Yaksha database 130 and applies the retrieved keys to the encrypted communication to decrypt the request.

Next, in step 530, the security server 120 encrypts the request with the second portion of the first user's private key and the first user's public key, to form a second encrypted message. In step 540, the second encrypted message is transmitted as message 91 to the client station 110 via network 60.

The client station 110, in step 550, further encrypts the second encrypted message with the first portion of the first user's private key, to form a third encrypted message. The client station 110 then transmits the third encrypted message to the file server 150 as message 10' in step 560.

The file server 150, in step 570 retrieves the request by applying the first user's public key to the third encrypted message. It will be noted that the file server is assured of the validity of the request because in order to decrypt the third encrypted message both the first user and the security server 120 must have signed a portion of the first user's private key to the request.

The file server 150 retrieves the encrypted symmetric crypto-key and encrypted data from storage in step 580. The file server 150 first decrypts the encrypted crypto-key by applying its first private key portion thereto, and thereby obtains the crypto-key in step 585. In step 590, the file server 150 decrypts the encrypted data with the crypto-key. The data can now be transmitted, in step 595 by the file server 150 via the network 60 to the client server 110 as message 11'.

FIGS. 6–11 depict computers suitable for use as the client stations 110 or 140, the security server 120 and the file server 150 shown in FIG. 2. The computers are preferably commercially available personal computers or high-powered work stations. Each computer's processor could, for example, be a Pentium™ processor. Any commercially available keyboard and/or mouse and monitor can be utilized. A high-speed network interface, including a high-speed modem, is preferred although not mandatory. The depicted configuration of the computers is exemplary. One or more of the computers could, if desired, also or alternatively include other components (not shown), such as an optical storage medium. Any number configurations could be suitable for implementing the invention so long as sufficient storage capacity and processing capability are provided. All of the computers are depicted as having similar hardware configurations, although this is not necessarily the case. For example, as will be well understood by the skilled artisan, it may be desirable for components of the respective computers to have attributes such memory storage capacity, data transmission rates and processing speeds which differ. In this regard, typically the security and file servers 120 and 150 would include a much larger hard drive and a faster processor than the client stations 110 and 150.

Figure 6:
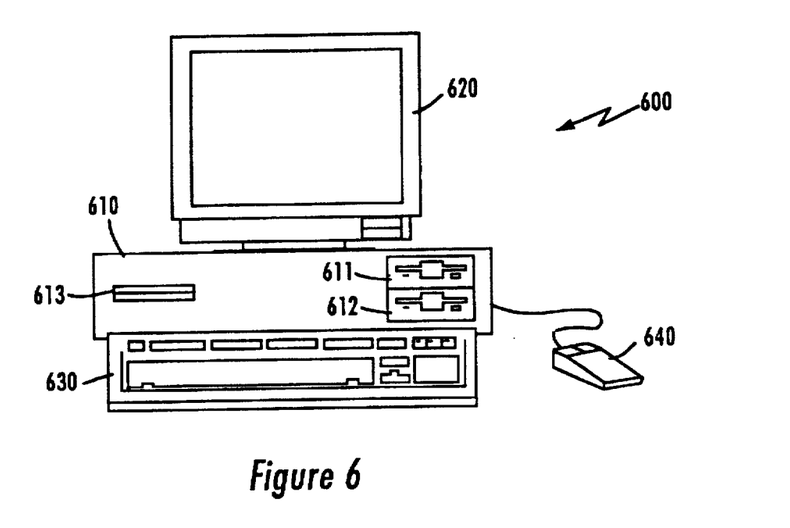
FIG. 6 depicts a computer suitable for use as a client station depicted in FIG. 2.
Figure 7:
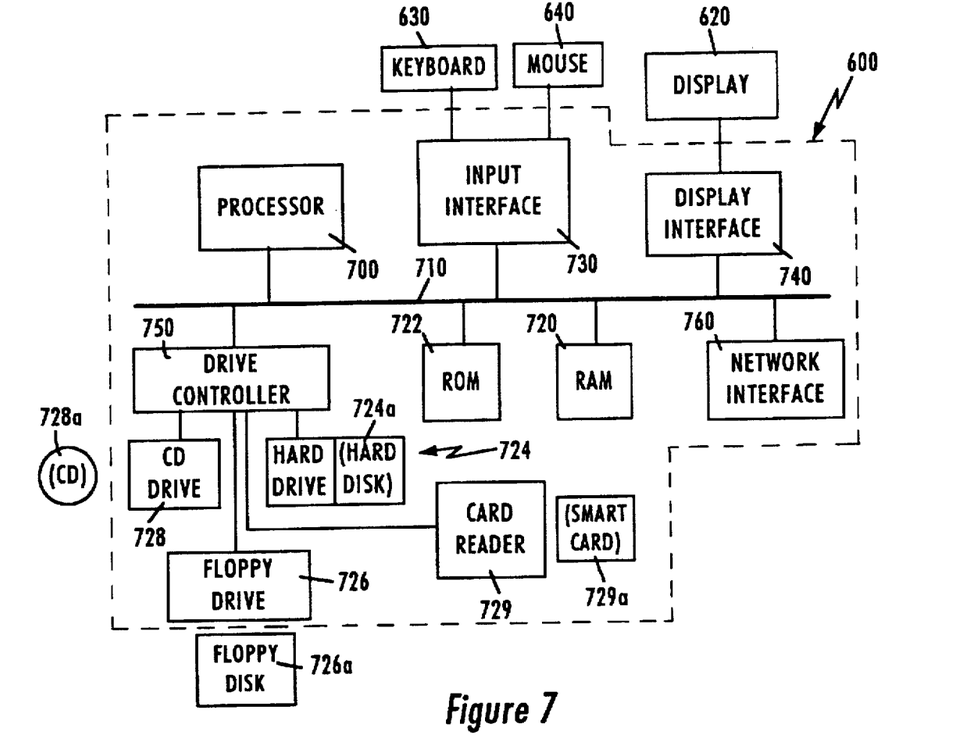
FIG. 7 is a exemplary block diagram of the computer depicted in FIG. 6.

Each of the computers differ in their respective programming instructions so that each of the computers is uniquely driven to operated in accordance with the present invention. That is, the functionality of each of the computers described with reference to FIGS. 6–11 varies from that of the other computers due to the programming instructions which drive its operation. It will be understood that although FIGS. 6 and 7 depict a computer which could be utilized as either of client stations 110 or 140, each of these processors will be driven to operate as described below by a different set of programming instructions even though the hardware components may be identical. It will also be recognized by those skilled in the art that only routine programming is required to implement the required programming instructions.

To avoid unnecessary duplication the computers depicted in FIGS. 6–11 will be generally described only with reference to FIGS. 6 and 7. It should be understood that the corresponding components of the computers depicted in FIGS. 8–11 will be similar. Further, since the computer components and configurations are conventional, routine operations performed by the depicted components will generally not be described, such operations being well understood in the art.

Preferably, each of the computers initially stores its unique programming instructions on its ROM or hard disk. The private key portion of the user's long term crypto-key which the user retains may, if desired, be stored in each computer on the hard disk. However, this should only be necessary for those user's who do not have an associated split private key or have their full private key on a smart card. Session keys are preferably stored on the RAM. Additionally, the programming instructions other information stored initially on the ROM or hard disk will typically be downloaded to the RAM during operation of the computer and accessed during operations directly from the RAM. The computer 600', i.e., the computer which serves as the security server 120, could if desired include the Yaksha database 130 stored preferably on its hard disk.

Referring now to FIGS. 6 and 7, the computer 600 includes a main unit 610 with slots 611, 612 and 613, respectively provided for loading programming or data from a floppy disc 726a, CD 728a and smart card 729a onto the computer 600. The computer 600 also includes a keyboard 630 and mouse 640 which serve as user input devices. A monitor display 620 is also provided to visually communicate information to the user.

As depicted in FIG. 7, The computer 600 has a main processor 700 which is interconnected via bus 710 with various storage devices including RAM 720, ROM 722 and hard disk 724a, all of which serve as a storage medium on which computer programming or data can be stored and accessed by the processor 700. The main processor 700 is also interconnected via bus 710 with various other devices such as the floppy disc drive 726, the CD drive 728 and the card reader 729 which are capable of being controlled by drive controller 750 to read computer programming or data stored on a floppy disc 726a, CD 728a or smart card 729a when inserted into the appropriate slot 611, 612 or 613 in the unit 610. By accessing the stored computer programming the processor 700 is driven to operate in accordance with the present invention.

The processor 700 is also operatively connected to the keyboard 630 and/or mouse 640, via input interface 730. The display monitor 620 is also interconnected to the processor 700, via display interface 740, to facilitate the display of information to the user. The network interface 760 is provided to interconnect the processor 700 to the network 60 depicted in FIG. 2 and accordingly allow communications between the computer 600 and other network devices. Since the computer 600 serves as the client station 110 or 140, the network interface allows communications between client stations 110 and 140 and with network servers 120 and 150.

The inter-operation of the various components of the computers depicted in FIGS. 6–11 in implementing the steps described above with reference to FIGS. 3-5 will now be described. Referring first to FIGS. 6 and 7, in order for the first user to request a session key for a session with the second user from the security server 120, the user enters a command using the keyboard 630 or the mouse 640, responsive to which the computer programming stored, for example, initially on ROM 722 and downloaded to RAM 720 during operation of the system, drives the processor 700 to encrypt the session key request with the first portion of the first user's private key which may be either retrieved from storage on, for example, hard disk 724a, or entered on the keyboard by the user, as described in step 200 of FIG. 3.

The processor, in accordance with the stored programming instructions, drives the network interface 760 to transmit the encrypted request for a session key to the security server 120 as described in step 210 above. This step may be performed automatically or may require a prompting from the user via the keyboard 630 or mouse 640. An indication that the request has been transmitted may be displayed on the display 620.

Figure 8:
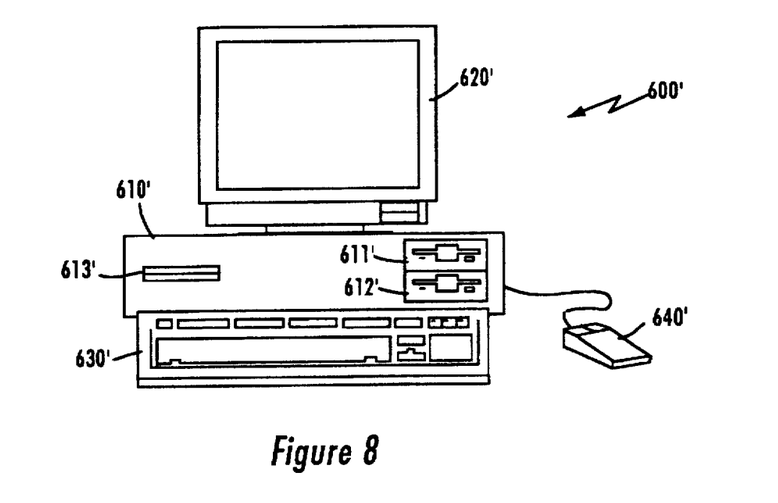
FIG. 8 depicts a computer suitable for use as the security server depicted in FIG. 2.
Figure 9:
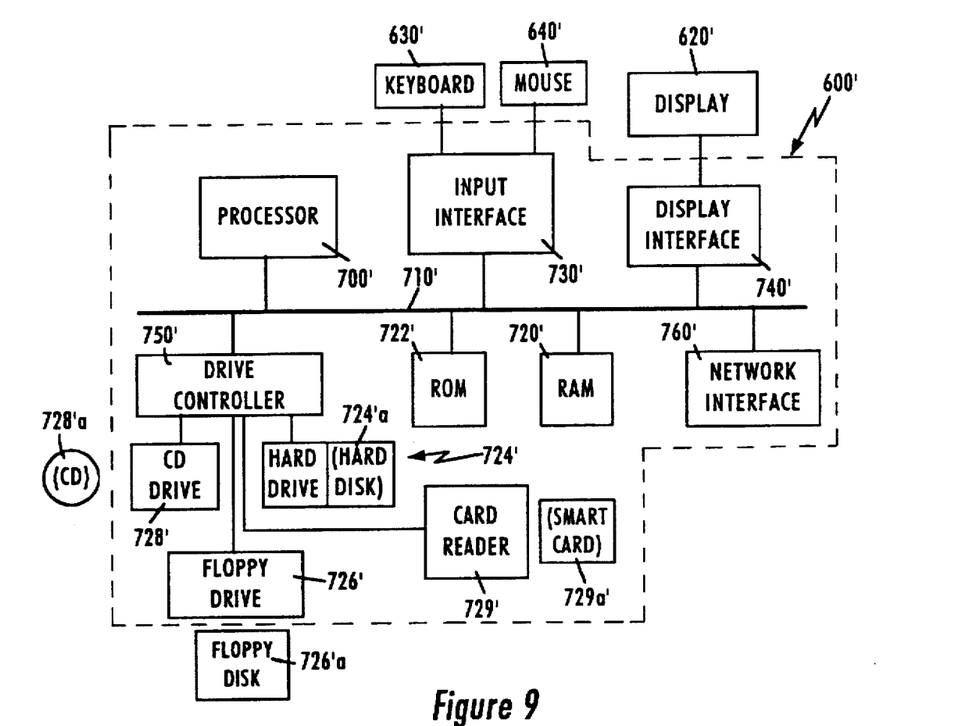
FIG. 9 is a exemplary block diagram of the computer depicted in FIG. 8.

Referring now to FIGS. 8 and 9, the encrypted request is received by the processor 700' via the network interface 760'. In accordance with programmed instructions initially stored on ROM 722' and downloaded to RAM 720' during system operation. The processor is driven to retrieve the second portion of the first user's private key and the first user's public key from the hard disk 724a' which serves as the Yaksha database 130 of FIG. 2, and to apply the retrieved keys as described in step 220 to decrypt the encrypted request.

Responsive to the request, the processor 700' is driven to generate a session key as described in step 230 and to encrypt the generated session key with the second portion of the first user's private key and the first user's public key as discussed above with reference to step 240. In accordance with its programmed instructions, the processor 700' also retrieves, from the hard disk 724a', the second user's public key and applies this key to separately encrypt the session key as described in step 250. The processor 700' now drives the network interface 760' to transmit the first and second encrypted session keys to client station 110 via the network 60 as discussed in step 260.

Referring again to FIGS. 6 and 7, the first and second encrypted session keys are received by the processor 700 via the network interface 760. The first encrypted session key is decrypted by processor 700 in accordance with its programmed instructions as described in step 270. The processor 700 is next driven to encrypt a communication from the first user, which has been entered via the keyboard 630 and displayed on the display 620, with the session key as discussed in step 280. The processor 700 now drives the network interface 760 to transmit the encrypted message and second encrypted session key to the client station 140 processor as indicated in step 285. The client station 140 processor is now driven by its stored programming instructions to decrypt the second encrypted session key and to then apply the session key to decrypt the encrypted communication from the first user as discussed in steps 290-295. The client station 140 processor is also driven to encrypt a reply message which is input via the station 140 keyboard by the second user with the session key and to drive the network interface of client station 140 to transmit the encrypted reply to client station 110 via the network 60 as described in step 297.

Referring again to FIGS. 6 and 7, the computer 600 will, in accordance with its stored programming instructions, operate in a similar manner to that described above in requesting a symmetric crypto-key to be used to store encrypted data as described in steps 300-310 of FIG. 4. The security server shown in FIGS. 8 and 9 will likewise operate in the similar manner to that described above in decrypting the request and generating a symmetric crypto-key to be used for file storage as described in steps 320-330.

The processor 700' will next be driven by its programming instructions to retrieve the second portion of the file server private key from the hard disk 724a' and to apply this key portion to encrypt the generated symmetric crypto-key as described in step 340. The processor 700' then drives the network interface 760' to transmit the encrypted crypto-key to client station 110 via network 60 as described in step 350.

Returning to FIGS. 6 and 7, the encrypted crypto-key is received by the processor 700 via network interface 760. Data is retrieved from storage on, for example, RAM 720 in accordance with instructions entered by the user via keyboard 630 or mouse 640 and transmitted along with the encrypted crypto-key by the network interface 760 to the file server 150 as discussed in step 360.

Figure 10:
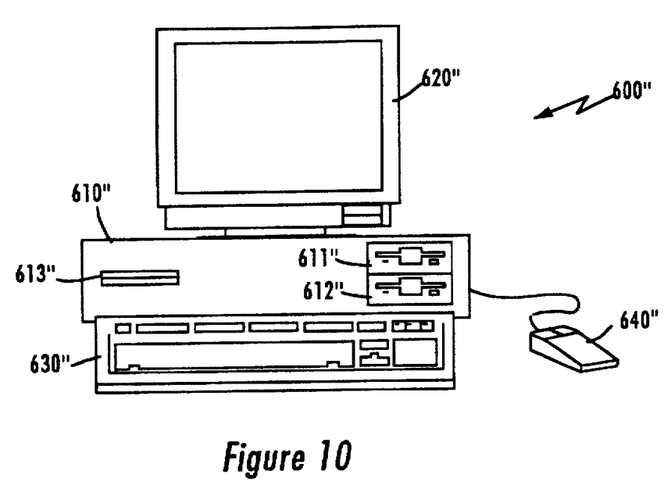
FIG. 10 depicts a computer suitable for use as the file server depicted in FIG. 2.
Figure 11:
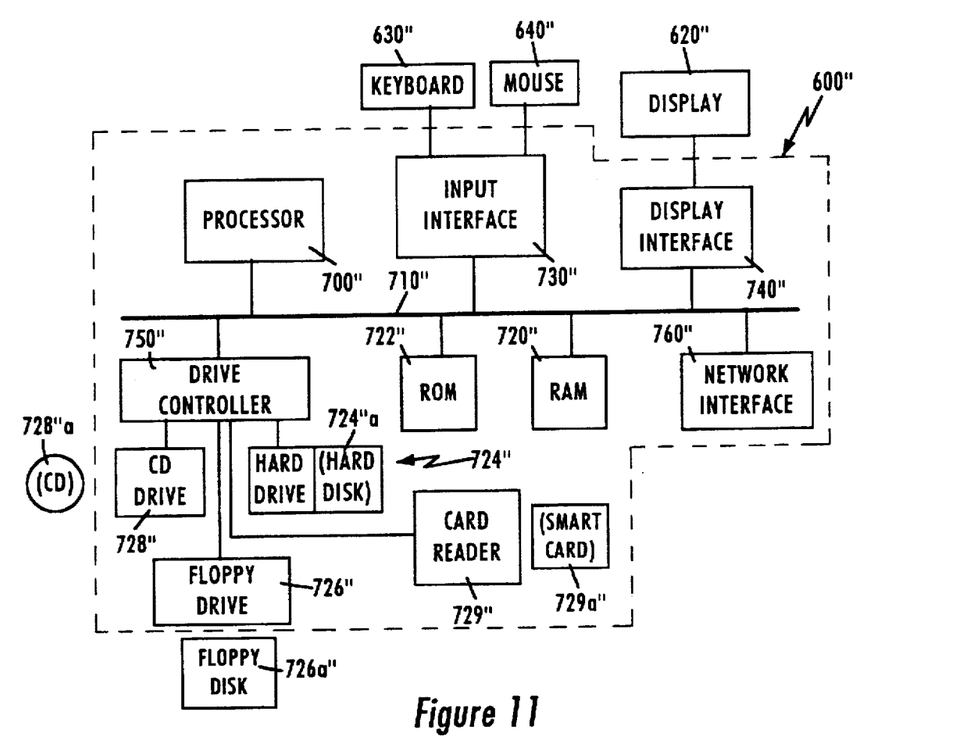
FIG. 11 is a exemplary block diagram of the computer depicted in FIG. 10.

Referring now to FIGS. 10 and 11, the processor 700" receives the data and encrypted crypto-key via network interface 760". The processor 700" is driven by its stored programmed instructions to retrieve the first portion of the file server's private key from storage on, for example, hard disk 724a" and apply this key portion to decrypt the encrypted crypto-key as described in step 370. The processor 700" is then driven to encrypt the data with the symmetric crypto-key and store the data and encrypted crypto-key on hard disk 724a" as described in steps 380-390.

Referring again to FIGS. 6 and 7, the computer 600 will operate in a manner similar to that described above in encrypting and transmitting a data request to the security server 120 as described in steps 500-510. Similarly, the computer 600' will operate as previously described in decrypting the encrypted request as discussed in step 520. The processor 700' will then retrieve the second portion of the first user's private key from the hard disk 720a'. As described in step 530, the processor 700', driven by its programming instructions, is driven to encrypt the data request with the retrieved key portion. The processor 700' then drives the network interface 760' to transmit the encrypted data request to the client station 110 as indicated in step 540.

Referring to FIGS. 6 and 7, the processor 700 receives the encrypted data request via the network interface 760. The processor 700, in accordance with its programmed instructions, applies the first portion of the first user's private key to the encrypted data request received from the security server 120 to further encrypt the data request as disclosed in step 550. The further encrypted data request is then transmitted by network interface 760, in accordance with signals from the processor 700, via network interface to the file server 150, as described in step 560.

Referring now to FIGS. 10 and 11, the processor 700" receives the fully encrypted data request via network interface 760". The processor 700", in accordance with its programmed instructions, retrieves the first user's public key from, for example, the hard disk 724a", and applies this key to decrypt the data request which has been received from the first user, as discussed in step 570 above. In response to the request, the processor 700" is driven to retrieve the stored encrypted crypto-key and encrypted data along with the second portion of the file sever's private key from the hard disk 724a" as described in step 580. The processor 700", in accordance with its programmed instructions, decrypts the encrypted crypto-key and then the encrypted data, as noted in steps 585–590. The processor 700" next drives the network interface 760" to transmit the data to the client station 110 as indicated in step 595.

As described above the present invention provides for exchanges of symmetric session crypto-keys between uses of virtual area networks, such as the INTERNET, who utilize different crypto-systems. The present invention additionally provides enhanced security for data stored on file servers and other storage devices directly or indirectly connected to such networks.

It will also be recognized by those skilled in the art that, while the invention has been described above in terms of preferred embodiments it is not limited thereto. Various features and aspects of the above described invention may be used individually or jointly. Further, although the invention has been described in the context of their use in a particular environment, i.e., the INTERNET, those skilled in the art will recognize that the present invention can be beneficially utilized in any environment in which not all users have a split private key or which would benefit from enhance security of stored files and data. Accordingly, the claims set forth below should be construed in view of the full breath and spirit of the invention as disclosed herein.

I claim:

1. A method for securing stored files in a system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion known only to a security server, comprising the steps of:

identifying data for storage;
   encrypting a symmetric crypto-key with the second private key portion of a first user crypto-key associated with a first user to form an encrypted key message;
   obtaining the symmetric crypto-key by applying the first private key portion of the first user crypto-key to decrypt the encrypted key message;
   encrypting said data with the symmetric crypto-key to form an encrypted file; and
   storing the encrypted file and said encrypted key message.

2. A method according to claim 1, further comprising the steps of:

encrypting a first retrieve file request with the first private key portion of a second user crypto-key associated with a second user to form a first encrypted retrieve file request;
   encrypting the first encrypted retrieve file request with the second private key portion of the second user crypto-key to form a second encrypted retrieve file request; and
   obtaining the first retrieve file request by applying the public key portion of the second user crypto-key to decrypt the second encrypted retrieve file request;
   retrieving the encrypted file and the encrypted key message from storage responsive to said retrieve file request;
   obtaining the symmetric crypto-key by applying the first private key portion of the first user crypto-key to decrypt the retrieved encrypted key message; and
   obtaining the data by applying the symmetric crypto-key to decrypt the retrieved encrypted file.

3. A method according to claim 2, further comprising the steps of obtaining the first retrieve file request by applying the second private key portion of the second user crypto-key to the first encrypted retrieve file request, and directing the data to the second user.

4. A method according to claim 1, wherein said first user is a file server.

5. A method according to claim 1, wherein each said key portion has a bit length and the bit length of each first private key portion is smaller than the bit length of the associated second private key portion.

6. A method according to claim 1, wherein the bit length of each said first private key portion is between 56 and 72 bits.

7. A method according to claim 1, wherein (i) each said private key portion is comprised of a private exponent and modulus N which is a product of a plurality of numbers within a set of large prime numbers, (ii) each said public key portion is comprised of a public exponent and the modulus N and (iii) the modulus N has a bit length and the bit length of each said private key portion is no larger than fifteen percent of the bit length of the modulus N but not less than 56 bits.

8. A system for securing stored files having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion known only to a security server, comprising:

a security server configured to encrypt a symmetric crypto-key to form an encrypted key message;
   a file server, having an associated file server crypto-key, configured to encrypt data with the symmetric crypto-key to form an encrypted file; and
   storage media configured to store the encrypted file and said encrypted key message;
   wherein, (i) the security server is operable to encrypt the symmetric crypto-key with the second private key portion of the file server crypto-key to form the encrypted key message, and (ii) the file server is operable to obtain the symmetric crypto-key by applying the first private key portion of the file server crypto-key to decrypt the encrypted key message.

9. A system according to claim 8, further comprising:

a user processor configured to encrypt a first retrieve file request with the first private key portion of a user crypto-key to form a first encrypted retrieve file request;
   wherein, the security server encrypts the first encrypted retrieve file request with the second private key portion of the user crypto-key to form a second encrypted retrieve file request, and
   wherein, the file server (i) obtains the first retrieve file request by applying the public key portion of the user crypto-key to decrypt the second encrypted retrieve file request, (ii) directs the retrieval of the encrypted file and the encrypted key message from the storage media responsive to the retrieve file request, (iii) obtains the symmetric crypto-key by applying the first private key portion of the file server crypto-key to decrypt the retrieved encrypted key message, and (iv) obtains the data by applying the symmetric crypto-key to decrypt the retrieved encrypted file.

10. A system according to claim 9, wherein said security server obtains the first retrieve file request by applying the second private key portion of the user crypto-key to the first encrypted retrieve file request, and the file server directs the data to the user processor.

11. A system according to claim 8, wherein each said key portion has a bit length and the bit length of each first private key portion is smaller than the bit length of the associated second private key portion.

12. A system according to claim 8, wherein the bit length of each said first private key portion is between 56 and 72 bits.

13. A system according to claim 8, wherein (i) each said private key portion is comprised of a private exponent and modulus N which is a product of a plurality of numbers within a set of large prime numbers, (ii) each said public key portion is comprised of a public exponent and the modulus N and (iii) the modulus N has a bit length and the bit length of each said private key portion is no larger than fifteen percent of the bit length of the modulus N but not less than 56 bits.

14. An article of manufacture for securing stored files in a system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion known only to a security server, comprising:

computer readable storage medium; and computer programming stored on said storage medium;

wherein said stored computer programming is configured to be readable from said computer readable storage medium by a computer and thereby cause said computer to operate so as to:

decrypt a symmetric crypto-key encrypted with the second private key portion of a user crypto-key associated with a user of said computer by applying the first private key portion of the user crypto-key, to thereby obtain the symmetric crypto-key;

encrypt data with the symmetric crypto-key to form an encrypted file; and store the encrypted file and the encrypted symmetric crypto-key.

15. An article of manufacture according to claim 14, wherein said stored computer programming is configured to be readable from said computer readable storage medium by the computer to thereby cause said computer to operate so as to:

decrypt a retrieve file request encrypted with the first and the second private key portion of a second user crypto-key by applying the public key portion of said second user crypto-key to obtain the retrieve file request;

retrieve the encrypted file and the encrypted symmetric crypto-key from storage responsive to said retrieve file request;

decrypt the retrieved encrypted symmetric crypto-key by applying the first private key portion of the user crypto-key to obtain the symmetric crypto-key; and decrypt the retrieved encrypted file by applying the symmetric crypto-key to obtain the data.

16. An article of manufacture according to claim 15, wherein said stored computer programming is configured to be readable from said computer readable storage medium by the computer to thereby cause said computer to operate so as to direct the data to the second user.

17. A programmed computer for securing stored files in a system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion known only to a security server, comprising:

a processor for decrypting a symmetric crypto-key encrypted with the second private key portion of a user crypto-key by applying the first private key portion of the user crypto-key, to thereby obtain the symmetric crypto-key, and encrypting data with the symmetric crypto-key to form an encrypted file;

storage media for storing the encrypted file and the encrypted symmetric crypto-key.

18. A programmed computer according to claim 17, wherein:

the processor is adapted to decrypt a retrieve file request encrypted with the first and the second private key portion of a second user crypto-key by applying the public key portion of said second user crypto-key to obtain the retrieve file request, to retrieve the encrypted file and the encrypted symmetric crypto-key from the storage media, to decrypt the retrieved encrypted symmetric crypto-key by applying the first private key portion of the user crypto-key to obtain the symmetric crypto-key, and to decrypt the retrieved encrypted file by applying the symmetric crypto-key to obtain the data;

the storage media is adapted to store the first private key portion of the user crypto-key.

19. A method for session key distribution in a system having a plurality of system users, each said user having an associated asymmetric crypto-key with a public key portion and a corresponding private key portion, each public key portion being accessible to the plurality of system users, the private key portion of a first user having a first private key portion known only to the first user and a corresponding second private key portion known only to a security server and the private key portion of a second user known only to the second user, comprising the steps of:

encrypting a symmetric session key request with the first private key portion of the first user crypto-key to form a first encrypted message;

decrypting the first encrypted message by applying the second private key portion of the first user crypto-key to thereby obtain the session key request;

encrypting a symmetric session crypto-key with the second private key portion of the first user crypto-key to form a first encrypted key message;

encrypting the symmetric session crypto-key with the public key portion of the second user crypto-key to form a second encrypted key message;

decrypting the first encrypted key message by applying the first private key portion of the first user crypto-key to obtain the symmetric session crypto-key for the first user;

decrypting the second encrypted key message by applying the private key portion of the second user crypto-key to obtain the symmetric session crypto-key for the second user;

encrypting and decrypting communications between said first user and said second user with the symmetric crypto-key.

20. A method according to claim 19, wherein said (i) each said private key portion is comprised of a private exponent and modulus N which is a product of a plurality of numbers within a set of large prime numbers, (ii) each said public key portion is comprised of a public exponent and the modulus N and (iii) the modulus N has a bit length and the bit length of each said private key portion is no larger than fifteen percent of the bit length of the modulus N but not less than 56 bits.

21. A system for session key distribution having a plurality of system users, each said user having an associated asymmetric crypto-key with a public key portion and a corresponding private key portion, each public key portion being accessible to the plurality of system users, the private key portion of a first user having a first private key portion known only to the first user and a corresponding second private key portion known only to a security server and the private key portion of a second user known only to the second user, comprising:

- a security server configured to encrypt a symmetric session crypto-key with the second private key portion of the first user crypto-key to form a first encrypted key message and to encrypt the symmetric session crypto-key with the public key portion of the second user crypto-key to form a second encrypted key message, and having an associated storage medium for storing the second private key portion of the first user crypto-key and the public key portion of the second user crypto-key;

- a first user processor configured to decrypt the first encrypted key message by applying the first private key portion of the first user crypto-key to obtain the symmetric crypto-key, and to encrypt communications to and decrypt communications from the second user with the symmetric crypto-key;

- a second user processor configured to decrypt the second encrypted key message by applying the private key portion of the second user crypto-key to obtain the symmetric crypto-key, and to encrypt communications to and decrypt communications from the first user with the symmetric crypto-key.

22. A system according to claim 21, wherein (i) each said private key portion is comprised of a private exponent and modulus N which is a product of a plurality of numbers within a set of large prime numbers, (ii) each said public key portion is comprised of a public exponent and the modulus N and (iii) the modulus N has a bit length and the bit length of each said private key portion is no larger than fifteen percent of the bit length of the modulus N but not less than 56 bits.

23. An article of manufacture for session key distribution in a system having a plurality of system users, each said user having an associated asymmetric crypto-key with a public key portion and a corresponding private key portion, each public key portion being accessible to the plurality of system users, the private key portion of a first user having a first private key portion known only to the first user and a corresponding second private key portion known only to a security server and the private key portion of a second user known only to the second user, comprising:

computer readable storage medium; and computer programming stored on said storage medium;

wherein said stored computer programming is configured to be readable from said computer readable storage medium by a computer and thereby cause said computer to operate so as to:

decrypt a first message encrypted with the first private key portion of the first user crypto-key by applying the second private key portion of the first user crypto-key to thereby obtain a session key request;

encrypt a symmetric crypto-key with the second private key portion of the first user crypto-key to form a first encrypted key message; and encrypt the symmetric crypto-key with the public key portion of the second user crypto-key to form a second encrypted key message;

wherein, the symmetric crypto-key is obtainable by the first user by applying the first private key portion of the first user crypto-key to the first encrypted key message and by the second user by applying the private key portion of the second user crypto-key to the second encrypted key message so that the symmetric crypto-key is available to encrypt and decrypt communications between said first and said second users.

24. A programmed computer for session key distribution in a system having a plurality of system users, each said user having an associated asymmetric crypto-key with a public key portion and a corresponding private key portion, each public key portion being accessible to the plurality of system users, the private key portion of a first user having a first private key portion known only to the first user and a corresponding second private key portion known only to a security server and the private key portion of a second user known only to the second user, comprising:

a processor for decrypting a first message encrypted with the first private key portion of the first user crypto-key by applying the second private key portion of the first user crypto-key to thereby obtain a session key request, for generating a symmetric crypto-key, for encrypting the symmetric crypto-key with the second private key portion of the first user crypto-key to form a first encrypted key message, and for encrypting the symmetric crypto-key with the public key portion of the second user crypto-key to form a second encrypted key message; and storage media for storing the second private key portion of the first user crypto-key and the public key portion of the second user crypto-key. wherein, the symmetric crypto-key is obtainable by the first user by applying the first private key portion of the first user crypto-key to the first encrypted key message and by the second user by applying the private key portion of the second user crypto-key to the second encrypted key message so that the symmetric crypto-key is available to encrypt and decrypt communications between said first and said second users.

* * * * *